United States Patent [19]

Wall

[11] 4,033,871

[45] July 5, 1977

[54] INTEGRATED MONITOR AND CONTROL SYSTEM FOR CONTINUOUSLY MONITORING AND CONTROLLING pH AND FREE HALOGEN IN SWIMMING POOL WATER

[75] Inventor: Frederick Wall, Elnora, N.Y.

[73] Assignee: Paddock of California, Inc., Rock Hill, S.C.

[22] Filed: Nov. 13, 1975

[21] Appl. No.: 631,544

[52] U.S. Cl. .................. 210/96 R; 137/5; 137/93; 210/62; 210/143; 210/169

[51] Int. Cl.[2] ...................... G05D 11/08

[58] Field of Search ........... 137/5, 93; 204/1 B, 204/1 H, 195 F, 195 G, 195 R; 210/62, 85, 96 R, 143, 169, 206

[56] References Cited

UNITED STATES PATENTS

| | | | |
|---|---|---|---|
| 1,530,833 | 3/1925 | Keeler | 210/62 X |
| 1,951,035 | 3/1934 | Parker | 137/93 |
| 2,382,734 | 8/1945 | Marks | 210/62 X |
| 2,586,169 | 2/1952 | Kline | 137/93 X |
| 2,656,526 | 10/1953 | MacKay | 210/62 X |
| 3,351,542 | 11/1967 | Oldershaw et al. | 137/93 |
| 3,592,212 | 7/1971 | Schleimer et al. | 204/195 F |
| 3,686,091 | 8/1972 | Sawa et al. | 210/96 X |
| 3,760,829 | 9/1973 | Schuk et al. | 210/96 X |
| 3,826,741 | 7/1974 | Nakamura | 210/96 X |
| 3,897,798 | 8/1975 | De Vale | 137/93 X |

Primary Examiner—Thomas G. Wyse
Assistant Examiner—R. G. Mukai

[57] ABSTRACT

An integrated monitor and control system for continuously monitoring and controlling pH and free halogen concentration in swimming pool water is provided, comprising, in combination, a first electrochemical flow cell having two electrodes and through which swimming pool water flows, giving rise to an electric potential between the electrodes in proportion to hydrogen/hydroxyl ion concentration in the pool water; means for measuring the electric potential across the electrodes in a manner correlated with pH of the pool water; a second electrochemical flow cell having two electrodes and through which swimming pool water flows giving rise to an electric potential between the two electrodes in proportion to the oxidation/reduction potential of the pool water; means for measuring the electric potential across the electrodes in a manner correlated with halogen concentration in the pool water; a first operational amplifier in electric connection with the first cell and arranged to respond to a pH outside a predetermined range and give a signal; first means responsive to the signal to adjust alkali or acid content of the pool water to restore pH to within the predetermined range; a second operational amplifier in electric connection with the second cell and arranged to respond to a halogen concentration outside a predetermined range and give a signal; second means responsive to the signal to adjust halogen concentration in the pool water to restore halogen concentration to within the predetermined range; and means for circulating pool water to, through and from each electrochemical cell and to and from a swimming pool water supply.

20 Claims, 7 Drawing Figures

INTEGRATED MONITOR AND CONTROL SYSTEM FOR CONTINUOUSLY MONITORING AND CONTROLLING pH AND FREE HALOGEN IN SWIMMING POOL WATER

In order to maintain sanitary conditions in a swimming pool, particularly one used by large numbers of people, it is essential to treat the water so as to prevent the invasion and growth of harmful bacteria, molds, fungi, and other microorganisms. The easiest and least costly way of accomplishing this is to add to the swimming pool water free halogen, such as chlorine or bromine, or a substance capable of liberating chlorine and/or bromine, in a sufficient concentration to be toxic to all harmful microorganisms.

It is generally recognized that a chlorine content within the range from 0.1 to 10 ppm is sufficient to provide an environment that is quite inhospitable to bacteria and similar microorganisms. The maintenance of such a small concentration of chlorine or bromine ion in swimming pool water under all use conditions does however pose a nice problem. In the normal course of events, the chlorine or bromine concentration of the water tends to decrease as the pool is used, and consequently the chlorine or bromine content must be replenished, either continuously, or from time to time, and at least when the pool is in use. Replenishment can be by addition of free chlorine or free bromine, or a substance capable of liberating chlorine and/or bromine in the swimming pool water, such as one of the substances described in U.S. Pat. Nos. 2,779,764, patented Jan. 29, 1957; 2,868,787 patented Jan. 13, 1959; 2,986,555, patented May 30, 1961; 3,071,591 patented Jan. 1, 1963; 3,147,219, patented Sept. 1, 1964; 3,147,254, patented Sept. 1, 1964; 3,147,259, patented Sept. 1, 1964; 3,345,371, patented Oct. 3, 1967; 3,507,917, patented Apr. 21, 1970, and 3,647,836, patented Mar. 7, 1972.

The addition of halogen such as chlorine and bromine to water results in the formation of a complex equilibrium among various kinds of chlorine-containing ions, by one or more of the following reactions:

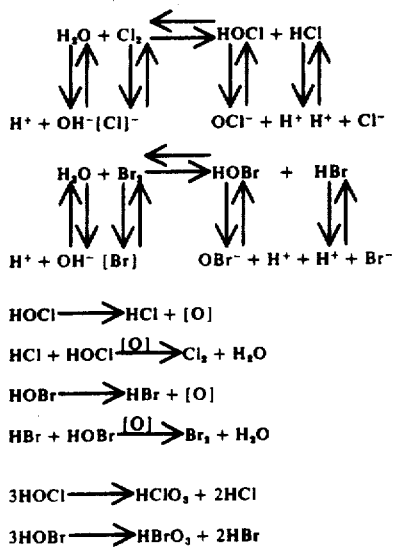

As the hypochlorous and hypobromous acids are easily decomposed, they have a strong oxidizing and therefore bactericidal action in swimming pool water. The first result of decomposition is the liberation of oxygen and hydrogen halide or hydrogen bromide. The oxygen then attacks the hydrogen bromide or hydrogen chloride, and produces free halogen. As a result, the bactericidal effect can be obtained either by the addition of free halogen, or by the addition of hypochlorite or hypobromite salt, i.e. sodium or calcium hypochlorite or hypobromite, with the same effect on the water.

A further reaction occurs by combination of three molecules of hypochlorous or hypobromous acid, resulting in the formation of chlorate or bromate. This reaction occurs more readily with hypobromous than with hypochlorous acid.

The decomposition of hypochlorite and hypobromite is affected by the presence of free acid. Solutions which have a high acidity are more effective oxidizing agents. A high concentration of hypochlorite or hypobromite is detrimental, since this results in more chlorate formation, and the chlorate is inactive.

The oxidizing power of the resulting solutions can be evaluated by use of a hydrogen electrode, since the reactions involve the exchange of electrical charges. Every reaction that involves an exchange of electrical charges is an oxidation/reduction reaction, and is made up of an oxidation reaction and a reduction reaction, each of which has its characteristic electrical potential. If the oxidation be carried out on the same reducing agent, such as, for example, a platinum electrode saturated with hydrogen, and immersed in a solution of constant hydrogen ion concentration, the reduction potential is constant, and the relative values of the electromotive force developed are determined by the potential difference at the oxidizing pole. In an electrochemical cell of the type hydrogen electrode/electrolyte/oxidizing agent the electromotive force developed is directly proportional to the power of the oxidizing agent. Consequently, it is possible to determine halogen concentration directly in a flow cell by utilizing a suitable reference electrode.

As is apparent from the above, the dissolution of chlorine and/or bromine in water also directly reduces pH, due to liberation of hydrogen ion from the water, and this gives rise to a further problem, which is maintenance of halogen concentration at a pH within a range that is not irritating to swimmers. If the pH is too acidic, or even too alkaline, most swimmers will find the water intolerable. In order to avoid irritation, the pH should be maintained above 7.4 and below about 9. Similarly, if the chlorine and/or bromine content is too high, irritation and even skin burns can result, and if it is too low, contamination will result.

The pH of the swimming pool water also has an effect upon the displacement of the equilibrium reaction set up between chlorine or bromine and the water. Hypochlorous acid HOCl and hypobromous acid HOBr are the most effective bactericidal compounds formed in the equilibrium, and it is therefore desirable to maintain the pH at a level such that the amount of HOCl or HOBr is at a maximum, and the amount of OCl$^-$ or OBr$^-$ is at a minimum. The degree of ionization of HOCl or HOBr increases as pH increases, since alkaline salts of these acids are more completely ionized. Above a pH of 7.6, the HOCl concentration is only 40%, and the OCl$^-$ concentration is 60%, so that the pH should be maintained below 7.6, if possible.

Thus, it follows that for optimum bactericidal action and minimum irritation, the pH range should be maintained between 7.4 and 7.6. This is a very narrow range, and consequently to maintain it is quite difficult. As a practical matter, it is impossible to do, because the pH and chlorine concentrations of the pool water cannot be monitored and controlled so closely, with existing equipment.

In most swimming pools, the chlorine or bromine content is controlled either by continuously feeding liquid chlorine or bromine or a solution thereof or of a hypochlorite or hypobromite salt to the swimming pool water in a small amount, determined from previous experience as the amount likely to maintain chlorine concentration or bromine concentration as the desired level, or by flowing the water over a bed of slowly dissolving particles of an organic or inorganic substance which, after dissolution in water, releases chlorine or bromine, such as chlorobromohydantoin as described in U.S. Pat. No. 3,412,021 patented Nov. 19, 1968. In this method, the volume of the bed and the amount of chemical in the bed are adjusted by trial and error, in accordance with flow rate, so that the amount of substance dissolved per unit time is that determined by previous experience as capable of providing a sufficient chlorine or bromine concentration to the water.

Naturally, neither of these systems is completely satisfactory, because any variation in the normal conditions, such as the entering of the swimming pool of a large number of people, can change the requirements, upset the equilibrium, and lead to a deficiency in chlorine or bromine. Similarly, if the number of people is too small, the concentration of chlorine or bromine can build up, and reach an excessively high level.

It is possible separately to measure halogen content of the swimming pool water, and also the pH, and then adjust pH and halogen content accordingly. This, however, requires manual observation from time to time, followed by manual adjustment. No system has been available which makes it possible to achieve the necessary control fully automatically without attention by an operator.

In accordance with the instant invention, a fully automatic, highly sensitive integrated monitor and control system is provided, for continuously monitoring and controlling pH and free halogen concentration in swimming pool water. The monitor and control system in accordance with the invention is extremely sensitive, and is capable of maintaining pH within a narrow range, such as for example, from about 7.4 to about 7.6, and also of maintaining halogen content within a narrow range, for example, from 0.1 to about 10 ppm. This the system of the invention can do fully automatically, and indefinitely, provided of course that the supply of chemicals required to adjust pH and halogen concentration is maintained.

The integrated monitor and control system in accordance with the invention comprises, in combination, a first electrochemical flow cell having two electrodes and through which swimming pool water flows, giving rise to an electric potential between the electrodes in proportion to hydrogen/hydroxyl ion concentration in the pool water; means for measuring the electric potential across the electrodes in a manner correlated with pH of the pool water; a second electrochemical flow cell having two electrodes and through which swimming pool water flows giving rise to an electric potential between the two electrodes in proportion to the oxidiation/reduction potential of the pool water; means for measuring the electric potential across the electrodes in a manner correlated with halogen concentration in the pool water; a first operational amplifier in electric connection with the first cell and arranged to respond to a pH outside a predetermined range and give a signal; first means responsive to the signal to adjust alkali or acid content of the pool water to restore pH to within the predetermined range; a second operational amplifier in electric connection with the second cell and arranged to respond to a halogen concentration outside a predetermined range and give a signal; second means responsive to the signal to adjust halogen concentration in the pool water to restore halogen concentration to within the predetermined range; and means for circulating pool water to, through and from each electrochemical cell and to and from a swimming pool water supply.

If desired, the system of the invention can be provided with means for recording both pH and halogen (chlorine or bromine) concentration, so that the course of changes in pH and halogen residual in the swimming pool water can be followed. This information can be useful to reveal faulty operation in some part of the swimming pool water circulation system, such as, for example, faulty excessive or insufficient halogen or alkali or acid feed to the water. Alarm circuits can also be included, which give an alarm when either pH or halogen content or both fall outside the prescribed ranges.

The drawings illustrate a preferred embodiment of the invention, in which.

An advantage of the system in accordance with the invention is that it employs available components, and does not require special equipment. The invention resides not in any components per se but in the combination of these components to achieve accurate and automatic control of pH and halogen concentration in swimming pool water within predetermined narrow or broad ranges.

Figure 1:
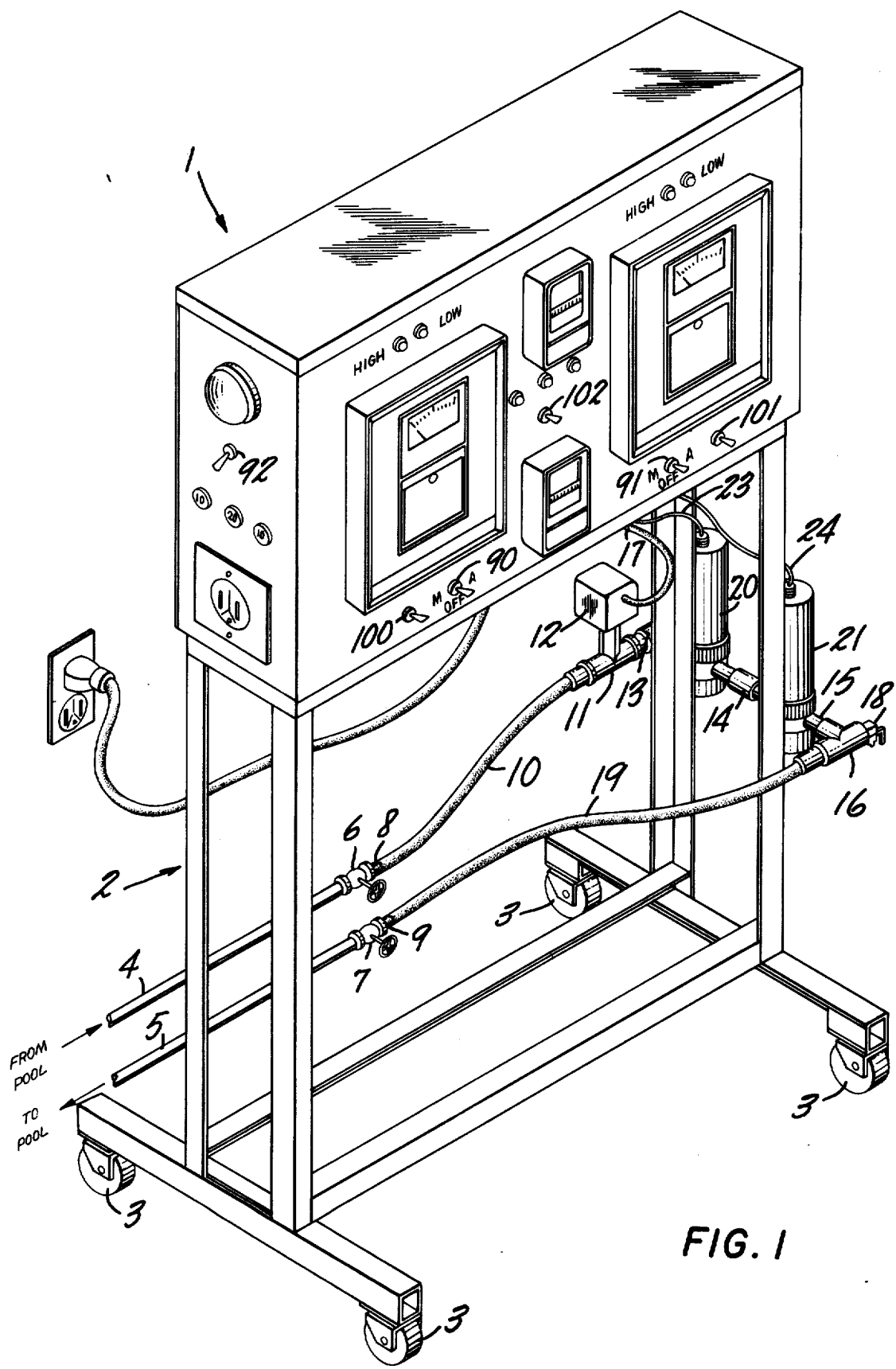
FIG. 1 represents a perspective view of a monitor and control system in accordance with the invention.

As seen in FIG. 1, the monitor and control system is housed in a cabinet 1 carried on a stand 2 at eye level, and the stand is mounted on four wheels 3 for mobility, to facilitate movement between convenient locations for operation and servicing or repair. In the location shown in FIG. 1, the cabinet is stationed adjacent piping 4, 5 acting as a sampling line leading from and returning to, respectively, the gutter return water line DW of a swimming pool on either side of the filter pump P and before the filter F (see FIG. 4). The pipes 4, 5 terminate with shut-off valves 6, 7 and nipples 8, 9 for attachment of hoses 10, 19.

The stand carries flexible plastic piping for circulation of swimming pool return water through electrochemical cells of the monitor and control system. The inlet hose 10 is attached at one end to nipple 8 of pipe 4, and at the other end to a flow cut-off solenoid valve 11, operated by an electric switch 12 in electrical connection via cable 17 with the electric system, as will presently be seen. From solenoid valve 11 a pipe 13 leads to the inlet side of an electrochemical cell 20, capable of measuring oxidation/reduction potential. On the outlet side of the cell, the pipe 14 leads to an electrochemical flow cell 21 capable of measuring hydrogen/hydroxyl ion concentration as an electric potential. Both cells are in electric connection with the electrical system, via cables 23, 24. From the outlet side of the second flow cell 21 the pipe 15 carries the water to a T-connection 16 equipped with a sampling port and valve 18. The flexible hose 19 attached to the T-connection 16 fits over the nipple 9 and connects with pipe 5 leading back to the gutter return water line DW. These lines can be closed by the valves 6, 7 when the hoses 10, 19 are to be disconnected.

Figures 2, 2A:
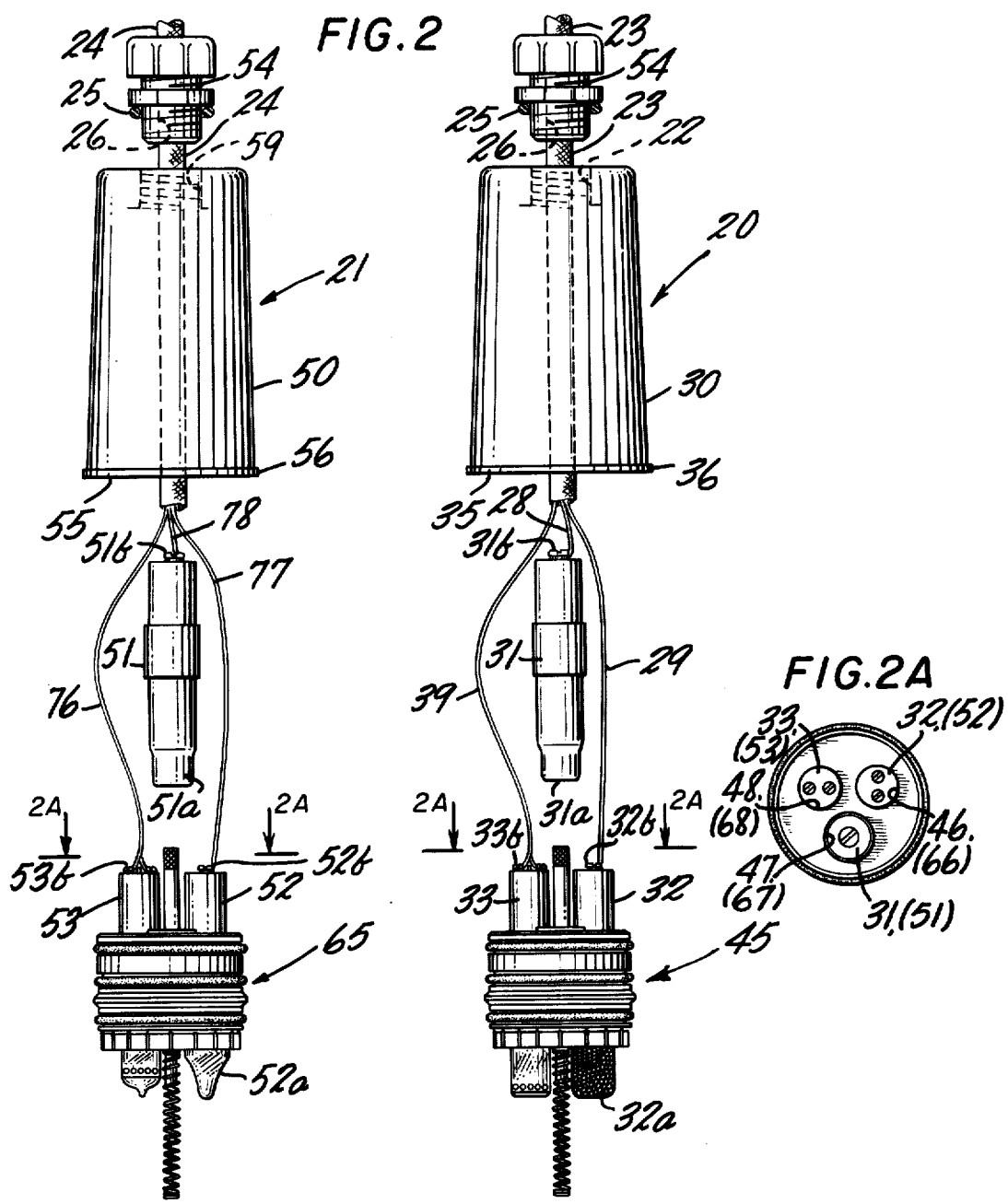
FIG. 2 represents an exploded view of the two electrochemical cells of the system of FIG. 1, one for detecting pH, and the other for detecting halogen content in the swimming pool water.
FIG. 2A is a top view of the electrochemical cells of FIG. 2, taken along the line 2A—2A of FIG. 2, with all electrochemical cells in place.

As best seen in FIG. 2, the oxidation/reduction flow cell 20 has a water-tight housing 30, enclosing a reference electrode 31 and a platinum sensing electrode 32, bathed in the swimming pool water as the electrolyte. The reference electrode 31 comprises an internal half cell supported in a container of nonconductive material containing a salt solution, an internal electrolyte, and a liquid junction structure of an ion-permeable material, as described in U.S. Pat. No. 3,686,091, patented Aug. 22, 1972 to Sawa and Neti which is herein incorporated by reference. Such electrodes are sold commercially under the trademark LAZARON.

In order to render the liquid junction more permeable to water, a surfactant, which modifies the contact angle between the solution and the liquid junction to less than about 90°, can be added to the salt solution.

The flow cell housing 30 is cup-shaped, with one open end 35 and an external flange 36 at that end which is grasped by the lock nut 37. The lock nut accordingly pulls down the housing 20 in a fluid-tight seal against a gasket 38 on the housing base 39, when the nut 37 is threaded the stub end 40 of the housing base 39. The base 39 includes the flow passage 41 for swimming pool water, which enters at the inlet 42 and leaves at the outlet 43.

Threaded on the internal threads in a socket 44 of the housing base 39 is an electrode retainer assembly 45. The electrode retainer assembly (as best seen in FIG. 2A, taken along the lines 2A—2A of FIG. 2) has three through bores, of which the first bore 46 receives the sensing electrode 32 of platinum; a second bore 47 receives the reference electrode 31; and a third bore 48 receives the resistor compensator 33, which is included for a purpose presently to be seen.

The electrodes 31, 32 and resistor 33 are retained in a press fit in the bores, and when the retainer assembly 45 is threaded all the way down in the socket 44 on the internal threads thereof, the tips 31a, 32a of the reference electrode 31 and of the platinum electrode 32 are bathed in swimming pool water flowing in passage 41, and thus are able to sense halogen ion concentration in the water, in terms of the oxidation/reduction potential developed at the reference electrode 31.

In fact, the reference electrode 31 is incapable of distinguishing among the several types of ions present which are capable of undergoing oxidation/reduction reactions. These include not only chlorine and/or bromine and hypochlorite and/or hypobromite, but also $H_2S$ and sulfides, $H_2SO_3$ and sulfites, and $HNO_2$ and nitrites, as well as organic material which may be dissolved in the water. However, by proper calibration of the voltmeters measuring the potential, it is possible to interpret the electric potential developed at the reference electrode in terms of the halogen (chlorine or bromine) concentration, using known procedures, which form no part of the instant invention.

At the top of the housing 30 is an aperture 22, also threaded internally, adapted to receive a cable boss 54, which threads therein in a leak-tight seal against gasket 25. The boss has a through passage 26 for the cable 23 carrying the electric wire connections which run between the electrodes and the resistor, and the operational amplifiers in the electric circuit of the system. Wire connections 28 run to and are attached to the electric base connector 31b on electrode 31, wire connectors 29 run to and are attached to the electric base connectors 32b on electrode 32, and wire connectors 39 run to and are attached to the electric base connectors 33b on the resistor 33.

The pH flow cell 21 is similar in all respects to the chlorine flow cell 20, with the exception that the sensing electrode 52 is a glass electrode, rather than platinum. The reference electrode 51 in this cell is also a LAZARON electrode.

The flow cell housing 50 is cup-shaped, with one open end 55, having a flange 56 which is grasped by the lock nut 57. The lock nut accordingly pulls down the housing in a fluid tight seal when threaded on the stub end 60 of the housing base 58. The base includes a flow passage 61 for swimming pool water, which enters at the inlet 62 and leaves at the outlet 63.

Threaded on internal threads in a socket 64 of the housing base 58 is an electrode retainer assembly 65, identical to that of flow cell 20. The electrode retainer assembly base 65 (seen in FIGS. 2A taken along the lines 2A—2A of FIG. 2) has three through bores, of which the first bore 66 receives the glass electrode 52, a second bore 67 receives the reference electrode 51, and a third bore 68 receives the temperature compensator 53, which is included for a purpose presently to be seen.

The electrodes are retained in a press fit in the bores, and when the retainer assembly 65 is threaded all the way down in the socket 64 on the internal threads thereof, the tips 51a, 52a of the reference electrode 51 and of the glass electrode 52 are bathed in swimming pool water flowing in passage 61, and thus are able to sense hydrogen (or hydroxyl) ion concentration in the water, in terms of a potential correlated with pH.

At the top of the housing 50 is an aperture 59, also threaded internally, and adapted to receive a cable boss 54, identical to that of cell 20, which attaches thereto in a leak-tight seal. The boss has a through passage 26 for the cable 24 carrying the electrical connections which run between the electrodes 51, 52 and the temperature compensator 53 and the operational amplifiers in the electric circuit of the system. Wire connections 78 run to and are attached to the electric base connector 51b on electrode 51, wire connections 77 run to and are attached to the base connector 52b on electode 52, and wire connections 76 run to and are attached to the base connectors 53b on the temperature compensator 53.

As indicated, the relationship between hydrogen ion activity and pH is dependent upon temmperature, and consequently the voltage developed by the pH flow cell 21 will vary with temperature. In order to eliminate this effect, the temperature compensator 53 is included in the pH cell. However, the oxidation/reduction potential measured by the halogen flow cell 20 is not temperature dependent. Consequently, a resistor element 33 is included in the halogen flow cell 20 to compensate for effect on current/potential of the temperature compensator 53 in the pH flow cell 21.

The glass electrode produces an electrical potential depending on the concentration (activity) of the hydrogen ion (or hydroxyl ion). The reference electrode completes the circuit, and furnishes a stable reference comparison for the glass electrode potential. The difference in potential between the glass and reference electrode is directly proportional to the pH of the solution.

Both the oxidation/reduction electrode system of cell 20 and the pH electrode system of cell 21 produce an electrical potential in millivolts, and this potential is applied to stable amplifiers. The resultant amplified signal is read out as halogen concentration or as pH. However, the pH reading is temperature dependent. The automatic temperature compensator 53, also immersed in the solution, makes the necessary compensation within the circuitry for changes in pool water temperature.

A very important feature of both the oxidation/reduction cell circuit and the pH cell circuit is a special circuit designed to eliminate the effects of what is known as "ground loop error". In ordinary pH analyzer/control systems, variation in earth potential causes errors in the instrument. The system of the invention uses a special integrated circuit with two amplifiers feeding a "difference" amplifier to cancel out "ground loop error". Thus, the system is inherently stable, and gives excellent control of the pH.

With the reference electrode used in ordinary systems, errors develop due to loss of essential potassium chloride in the electrode. The reference electrodes 31, 51 never require charging with potassium chloride. Thus, there are no potassium chloride errors due to contamination or loss.

The electrical connection between the salt solution and the swimming pool water whose pH or oxidation/reduction potential is being measured is made through the liquid junction structure of the reference electrodes 31, 51.

Figure 3:
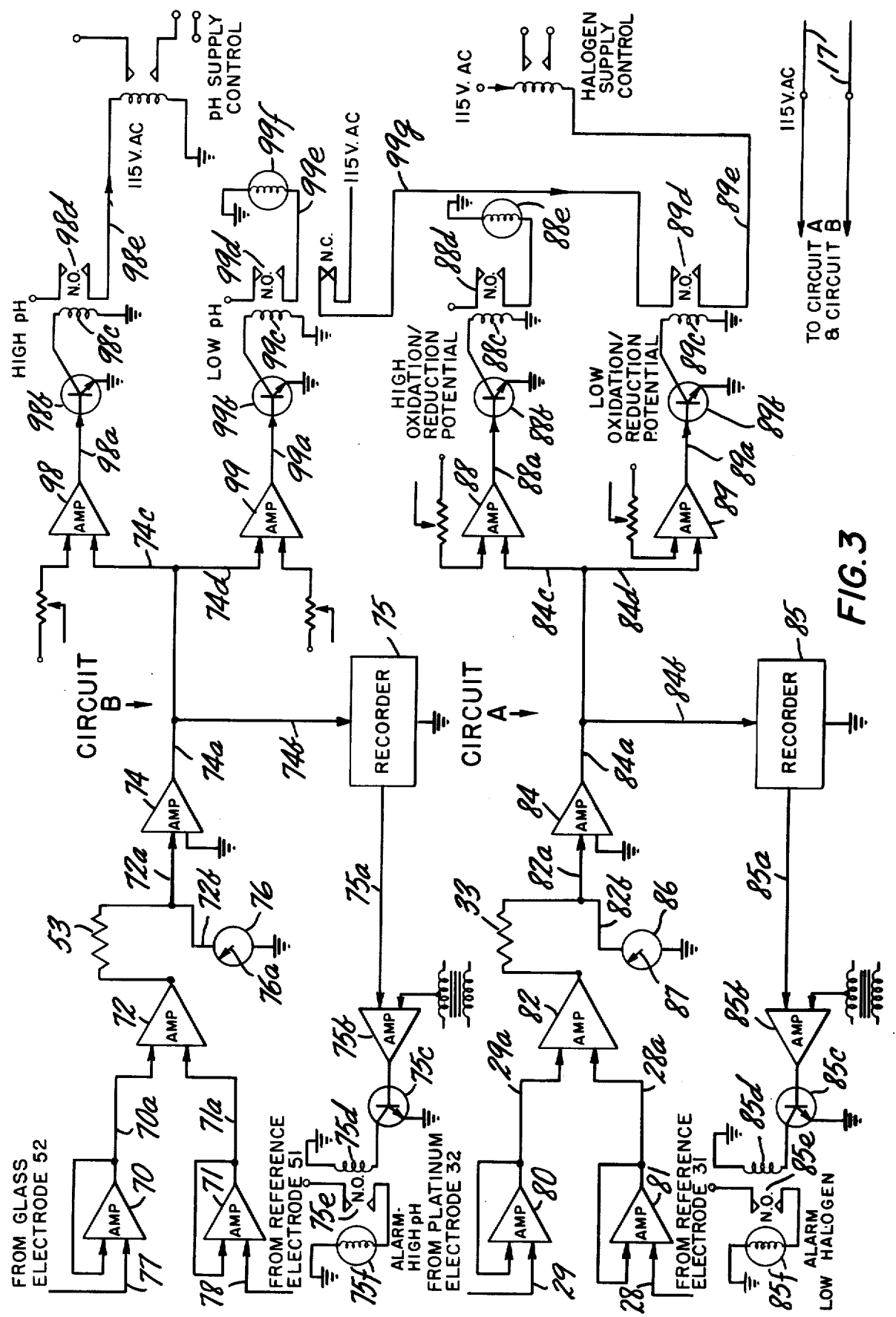
FIG. 3 is an electric circuit diagram showing the series and parallel wiring of the electric components of the monitor and control system of FIGS. 1 and 2.

The various components in the electric circuit and the manner in which they are connected are best seen in FIG. 3. The system includes two parallel circuits, Circuit A for the cell 20 determining halogen concentration, and Circuit B for the cell 21 determining pH. The two circuits are set up in parallel, and include similar components. They are also interconnected, as a fail-safe device.

The cable 23 from the cell 20 carries wire connection 29 from the platinum electrode 32 and wire connection 28 from the LAZARON or reference electrode 31. Each of these leads directly to a difference amplifier 80, 81, which is required to amplify the very small potential generated in the cell 20, measurable in picovolts (1 picovolt is one millionth of a volt). The difference amplifiers 80, 81 accordingly amplify the potential to a magnitude at which a difference between the potentials at 80, 81 can be detected by the difference amplifier 82. After such amplification the potentials from electrodes 31, 32 are transmitted via lines 28a, 29a to a third difference amplifier 82, which is capable of sensing the difference between the two voltage inputs. If the two voltage inputs are the same, or are within a predetermined limited range, the amplifier 82 does not respond. If the two voltage inputs differ by more than a predetermined maximum, the amplifier then gives a current output that is proportional to this difference. The current is carried on line 82a to a fourth difference amplifier 84, which amplifies the current to a point where it can actuate a recorder 85, connected thereto via line 84a, 84b. The difference amplifier 82 is also connected via 82a, 82b to a galvanometer 86, with a pointer 87 which reads directly (through calibration) in halogen ion concentration, in ppm.

The difference amplifier 84 is in connection via line 84a, 84c with an additional operational amplifier 88, and via line 84a, 84d with an additional operational amplifier 89. The amplifier 88 is set against a fixed signal for response when the signal from the difference amplifier exceeds a predetermined maximum, indicating an unduly high halogen ion concentration, i.e. exceeding 10 ppm. The other operational amplifier 89 is set for response when the signal from the difference amplifier 84 is below a predetermined minimum, indicating an unduly low halogen ion concentration, i.e. less than 0.1 ppm. When the amplifier 88 functions, current flows in line 88a, is amplified in the power transistor 88b sufficiently to actuate relay 88c to close switch 88d, and light an alarm light 88e.

On the other hand, if the signal from the difference amplifier is below a predetermined minimum, then the amplifier 89 passes an output current through line 89a, which is amplified sufficiently by power transistor 89b to actuate relay 89c and close switch 89d. This causes a current to flow in line 89e starting up a pump P2 and opening a solenoid valve S2 (see FIG. 4) controlling the admission of halogen to the clean water return feed line CW to the pool, to compensate for the low halogen value.

In the event the halogen concentration is low, an alarm light is actuated via line 84b, 85a, a difference amplifier 85b, a power transistor 85c, relay 85d, switch 85e.

As soon as the halogen content has been restored, the signal from the difference amplifiers 82, 84 changes, so that it is no longer below the predetermined minimum. The amplifier 89 ceases to give an output, and the switch 88d, which is normally open, is opened again, since there is no current in relay 89c to hold it closed. This closes off the circuit 89e and shuts off the flow of halogen to the water. Thus, the response is fully automatic and closes off the supply of halogen when halogen need no longer be supplied.

The Circuit B for the pH cell 21 is similar in principle and in operation. The wire 77 from the glass electrode and wire 78 from the reference electrode are each connected to difference amplifiers 70, 71, and these in turn feed their signal via lines 70a, 71a into a difference amplifier 72, from which an amplified potential is given via line 72a, 72b sufficient to operate galvanometer 76 and pointer 76a. The pointer reads off pH values on a scale, as a result of calibration.

The potential from the difference amplifier 72 is fed via 72a to another difference amplifier 74, which introduces a further amplification in current, to operate the recorder 75 via 74a, 74b. The signal from amplifier 74 proceeds via 74a, 74c to difference amplifier 98 and via 74a, 74d to difference amplifier 99. Amplifier 98 is set to respond and give a signal when the pH value is above a certain maximum, and the other is set to respond and give an output when the pH value is below a certain minimum.

If the pH value is too high, and the amplifier 98 responds, a current proceeds via line 98a to power transistor 98b where it is amplified sufficiently to actuate relay 98c, closing switch 98d so that current flows in circuit 98e, starting a pump P1 and opening a solenoid valve S1 (see FIG. 4) controlling the supply of acid and admitting acid to the clean water return feed line CW to the swimming pool, thus lowering the pH towards the acid side. This eventually results in a pH within the range at which amplifier 98 ceases to give a signal, as a result of which the switch 98d is opened, and the supply of acid is cut off.

On the other hand, if the pH value falls below a predetermined minimum, then the amplifier 99 gives an output via line 99a, which is amplifier by power transistor 99b sufficiently to actuate relay 99c, which results in the switch 99d being closed, closing the circuit 99e which lights an alarm light 99f.

If the pH continues to be low, the circuit 99g ensures that the circuit 89e does not open and admit halogen, since this would reduce pH still further.

When the pH has been restored to the normal range, amplifier 99 ceases to give an output. In consequence, the switch 99d opens, the circuit 99e is opened, and the alarm 99f is turned off. Thus, the response of the system to a low pH is also fully automatic.

Circuit B also has an alarm circuit for high pH. The current output from amplifier 74 via lines 74a, 74b, 75a actuates the difference amplifier 75b when the pH exceeds a predetermined maximum, which causes a current to flow to power transistor 75c, where it is amplified sufficiently to actuate relay 75d, close switch 75e and light the alarm light 75f. When pH is restored to normal, the amplifier ceases to give an output, and the light goes out.

The electrical connections 23, 24 to the electrodes of each cell penetrate the housings 30, 50 by way of the water-tight bosses 54, and lead to the galvanometers 76, 86 of conventional design, one for each cell. The galvanometer 86 is connected to cell 20, and galvanometer 76 is connected to cell 21. The galvanometers are equipped with pointers 76a, 87, of which the pointer 87 of galvanometer 86 reads against a scale calibrated directly in halogen content per unit volume of swimming pool water. The pointer 76a of galvanometer 76 reads against a scale calibrated directly in pH. Calibration of each galvanometer for these purposes is easily accomplished, by correlating the meter readings in picovolts against known chlorine and/or bromine ion concentrations and pH values of the pool water.

As seen in FIG. 3, each of the two flow cell circuits A and B includes seven operational amplifiers of conventional design, each of which is capable of sensing the difference between two voltage or current inputs. If the two inputs are the same, or are within a predetermined limited range, the amplifier gives no output. If the two inputs differ by more than a predetermined minimum, the amplifier then gives an output that is proportional to this difference. Each operational amplifier is so set that when a predetermined minimum output from the amplifier is exceeded, a signal is given, indicating that the minimum has been exceeded. This signal can take any of several forms.

The signal can, for example, be a warning light which lights up on the panel of the system, as seen in FIG. 1, and can be noted by an operator. The amplifier, alternatively or in addition, can also be arranged to actuate a switch which, for example, controls a solenoid valve S1, S2, opening the valve and releasing a chemical which is capable of correcting the conditions, either by increasing or by decreasing pH or halogen concentration, and thus restoring the system to normal. When the system returns to normal, the signal from the operational amplifier can be cut off, and the solenoid valve S1, S2 can be deactuated, slowing or cutting off the flow of chemical to the system.

The desired response is obtained from the operational amplifiers by setting up the amplifiers in the following manner: A standard signal of any desired magnitude is fed into the amplifier as the base signal. The other signal fed in is the variable signal from one of the flow cells. The difference between the two signals is thus determined as a difference against a standard voltage, and consequently the magnitude of the cell signal is readily evaluated against this standard.

The standards can be set at any desired voltage. Consequently, the standard is set in contemplation of the variations to be expected in the cell signal, such as the chlorine and/or bromine level or pH desired. For example, if the chlorine content is 1 ppm, and this corresponds to 10 millivolts, then the standard signal can be set at 10 millivolts. An increase in chlorine content beyond 1 ppm or a decrease below 1 ppm gives a variable signal whose magnitude is gauged against the 10 millivolt standard. When the variable signal reaches and exceeds a predetermined minimum, then a signal can be given by the operational amplifier, indicating that the chlorine content is more or less by a predetermined amount than 1 ppm. The amplifier via this signal at the same time or at a later time, after the difference has increase by a further increment, can also be made to operate a solenoid valve or pump, or another visual or audible signal, or both, as desired.

In fact, the operational amplifier can be made quite sensitive to very small changes in chlorine content, reflected in correspondingly small changes in the signal from the flow cell. The drive can in fact be made sensitive to changes as small as $\pm 0.1$ ppm of chlorine, and as small as $\pm 0.01$ pH unit.

While one operational amplifier for each cell can be arranged both to give an audible or visual signal, and actuate an automatic response in terms of chemical feed to the water supply, it is generally preferred that one operational amplifier be connected to the flow cell to control chemical feed, and another to give an alarm. In this way, it can be arranged that the alarm be given only if the chemical feed or other desired response is not effective to correct the condition.

In the electric circuit for each flow cell there is also provided a recorder 75, 85, which records the activity of the cell and any response by the operational amplifier connection with that cell to variations in halogen content or pH. This gives a visual record of the behavior of each circuit in the system, which is quite valuable for detecting malfunctions in the system, such as too much fresh water feed, or too much or too little feed of compensating chemicals to the water supply.

Switch 92 controls the "on" and "off" for the alarm, and switches 100, 101 are circuit "on" and "off" switches, while switch 102 is the main "on" and "off" switch.

Switches 90, 91 are included in each circuit to change the operation of each circuit separately or together from automatic (A on fascia panel) to manual (M on fascia panel). When the circuit(s) is on manual control, the galvanometers are still operative, and their scales still show pH and halogen content. It is then possible for the operator manually to control the feed of halogen and/or acid or base to the system, to adjust halogen concentration and/or the pH to whatever range is desired, regardless of the automatic setting of the system.

The system also includes a cut-off to halt feed of all control chemicals (halogen, acid, and base) if the ranges for which the system is set are exceeded by more than a predetermined minimum. Thus, if the pH range is exceeded so as to actuate feed of acid or base, but there is no feed of acid or base, then the pH will continue to increase or decrease by a further increment, and the automatic cut-off of the entire feed system will then follow at a predetermined range-exceeding increment. An illustration of this sort of malfunction is if chlorine is added in response to a diminution in chlorine content, but, due to exhaustion of the base supply, without feed of base to compensate for the increase acidity. Obviously, the chlorine feed cannot be permitted to continue, since this would lead to an intolerable pH. The system as a result consequently responds by a complete cut-off of all feed, including chlorine, which prevents this from happening. A visual or audible alarm can also be given at the same time, so that an operator is alerted that there is something awry that requires his attention. He can then determine from the readings on the scales what it is that is wrong, and act to rectify the condition or malfunction.

The flow switch 12 is arranged to respond so as to shut off the operation of the system, if the flow from the swimming pool or water supply stops.

Figure 4:
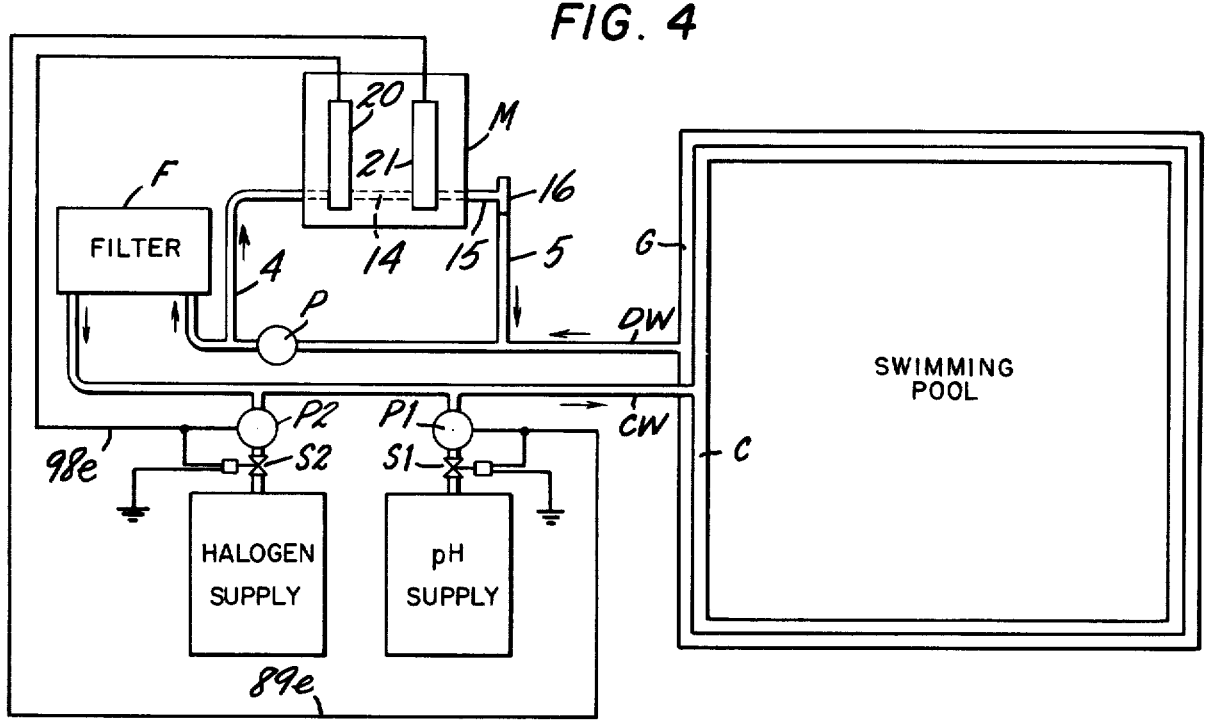
FIG. 4 is a pool water flow circuit diagram showing how the monitor and control system of FIGS. 1 and 2 controls pH and halogen content of the pool water, using sodium hypochlorite or hypobromite as a halogen source.

One embodiment of swimming pool water circulation system in which the monitor and control system of the invention is fitted to control pH and halogen content of the pool water is shown in FIG. 4. The swimming pool is of conventional design, and is fitted with a peripheral water feed conduit and water return gutter conduit of the type described in U.S. Pat. Nos. 2,932,397 issued Apr. 12, 1960 to J. F. Ogden; 3,363,767 issued Jan. 16, 1968 to H. S. Ellis; 3,668,712 issued June 13, 1972 to William H. Baker; 3,668,713 issued June 13, 1972 to William H. Baker; 3,668,714 issued June 13, 1972 to William H. Baker, and 3,815,160 issued June 11, 1974 to William H. Baker.

The water is circulated between the swimming pool and a filter via a pump. The dirty water return line DW leads from the gutter conduit G at the periphery of the pool to the filter pump P1 and hence to the filter F, where suspended material is removed, and the clean water is then returned to the pool via the clean water feed line CW directly to the water feed conduit C at the periphery of the pool. The filter pump P circulates the water between the swimming pool and the filter.

The sampling pool water line 4 leads from the pressure side from the filter pump P directly to the halogen cell 20 and thence via line 14 to the pH cell 21 of the monitor and control system of the invention M, and thence via lines 15 and 5 back to the dirty water feed conduit DW leading to the filter pump P.

An electric line 98e (which is a part of the electric circuit responsive to the halogen concentration sensed by the halogen cell) leads to the solenoid valve S2 and the pump P2. A low halogen reading at the halogen cell 20 results in current flow in the line 98e, opening the solenoid valve S2, and actuation of the pump P2, feeding from the halogen supply reservoir aqueous solution of chemical supplying halogen to the clean water feed conduit CW and thence to the clean water feed conduit C at the periphery of the swimming pool.

Similarly, whenever the pH sensed by the pH cell 21 is too high, i.e. too alkaline, or too low, i.e. too acid, current flows in the line 89e, actuating the solenoid valve S1 and the pump P1, and consequently, an aqueous solution of acid or base is fed from the pH supply reservoir tending to adjust pH of the clean water in feed conduit CW.

Feed of halogen-supplying chemical and/or pH control chemical continues until the halogen cell and pH cell, respectively, sense a halogen concentration and/or a pH which is adequate, whereupon the solenoid valves S1 and S2 and pumps P1 and P2 are shut off. The system operates in this condition until once again the halogen content and/or pH are outside the range for which the monitor and control system is programmed, whereupon the cycle is repeated.

Figure 4A:
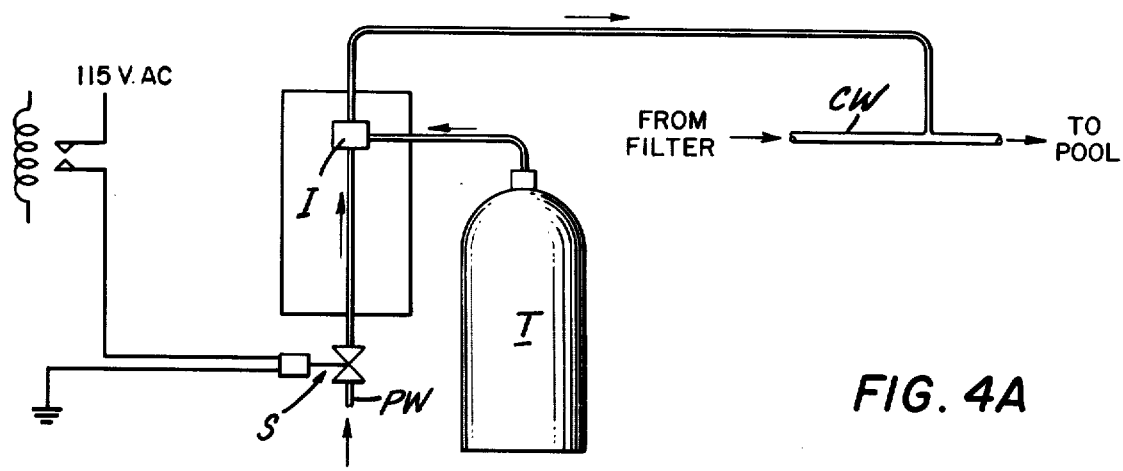
FIG. 4A shows a variation of FIG. 4, using chlorine or bromine gas as a halogen source.

The set-up shown for pH control and halogen supply in FIG. 4 is suitable for feed of an aqueous solution of sodium or potassium hypochlorite as the halogen supplying chemical and for feed of either aqueous acid or base solution for control of pH. If gaseous chlorine or bromine is to be used, a somewhat different set-up is desirable, as shown in FIG. 4A. In this case, a tank T of chlorine gas or bromine gas is fitted to an injector I with a solenoid valve S controlling water from a pressure water supply PW. The monitor and control system halogen cell circuit is arranged to actuate the solenoid valve S, and when the solenoid valve is actuated, water flows through the injector I and draws chlorine or bromine gas from the tank T, which then dissolves in the water and is passed into the clean water feed line CW as shown in FIG. 4A.

Figure 4B:
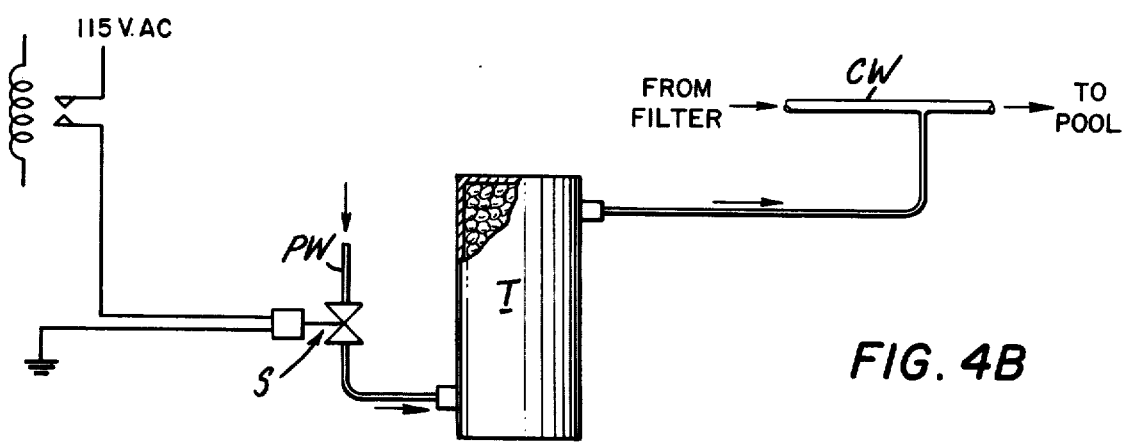
FIG. 4B shows a further variation of FIG. 4, using sticks supplying bromine and/or chlorine as the halogen source.

For use of a chemical in solid form, from which bromine or chlorine is leached out, such as (for example) sticks or pellets of bromchlorodimethylhydantoin or potassium or sodium dichloro or bromchloro isocyanurate, a set-up like that shown in FIG. 4B is desirable. In this instance, the tank T contains a supply of slowly water-soluble sticks or pellets of the halogen-supplying chemical. A pressure water supply PW is linked to this tank, and the feed of water from the supply is controlled by the solenoid valve S. The solenoid valve is connected to the halogen cell circuit of the monitor and control system. When the halogen requires replenishment, the solenoid valve is actuated, the water from the pressure water supply flows into the tank T and over the solid halogen-supplying chemical, the halogen (bromine or chlorine or both) is introduced from the solid material in the tank, and the resulting solution is then fed to the clean water feed conduit CW and thence to the pool, as shown in FIG. 4B.

A similar arrangement can be used for a supply of solid chemical supplying acid or base to the system, controlled by the pH cell.

The system in accordance with the invention can be used for control of:

i. Halogen, for example:
  a. Hypochlorite or hypobromite (aqueous solution of sodium or calcium hypochlorite or hypobromite).
  b. Chlorine gas or aqueous chlorine solution.
  c. Organic compounds liberating chlorine and/or bromine such as bromchlorodimethylhydantoin and potassium or sodium dichloro or bromchloro isocyanurate.
  d. Bromine gas or aqueous bromine solution.

ii. pH, for example:
  a. aqueous hydrochloric acid solution
  b. aqueous sodium bisulphate solution
  c. aqueous sodium hydroxide solution
  d. aqueous sodium carbonate solution.

The system will operate solenoid valves and chemical feed pumps. These can be connected directly into the electric circuit.

The water that passes through the cells is returned through a line to the pool water pump (suction side) or into the tank of a vacuum filter. The water is not modified in any way. The cell hydraulics are not disturbed if inspection or replacement of electrodes is required. The flow rate through the cells can be from 3 to 5 gallons per minute.

The system of the invention offers the following advantages:

1. Reduced operator time at the pool.
2. Prevention of a scale build-up.
3. Prevention of cloudy water.
4. Continuous disinfection of the pool water.
5. Elimination of eye burning.
6. Elimination of "chlorinous" odors.
7. Continuous maintenance of essential "free chlorine" or an adequate concentration of bromine in the pool.
8. Maximum efficiency from chlorine and bromine, thus maximum use and dollars saved.
9. Elimination of swimmer discomfort.
10. Maintenance of the Health Department standard for halogen residual and pH on 24 hour basis.
11. Control of corrosion problems.
12. A continuous record of pH and chlorine or bromine residual.

The system of the invention can offer the following features, in operation and control, in any desired combination:

1. Continuous monitoring of pH and chlorine or bromine residual.
2. Recording of pH and chlorine or bromine residual.
3. MANUAL/AUTO control option.
4. ALARM visual and audo.
5. Automatic temperature compensation.
6. Integrated Plug-in circuitry.
7. Plug-in receptacle for chemical control equipment.
8. Quick-release electrodes.
9. No flow shut-down switch.
10. Ease-change spans for desired pH and chlorine ranges.
11. Feed event recording option.
12. Emergency shut down-low pH.

Safety can be ensured by providing setting controls behind a locked front panel. A strip chart with inkless recorders can also be neatly fitted into the panel. The cabinet or housing can be fabricated from corrosion resistant stainless steel.

Having regard to the foregoing disclosure, the following is claimed as the inventive and patentable embodiments thereof:

1. A swimming pool system having pool water monitored for independent and concomitant control of halogen concentration and pH, comprising, in combination, a swimming pool; an integrated monitor and control system for continuously monitoring and independently controlling pH and free halogen in swimming pool water; and line connections for circulating swimming pool water flow therebetween; the monitor and control system comprising, in combination, a first electrochemical flow cell having two electrodes and through which swimming pool water flows, giving rise to an electric potential between the electrodes in proportion to hydrogen/hydroxyl ion concentration in the pool water; means for measuring the electric potential across the electrodes in a manner correlated with pH of the pool water; a second electrochemical flow cell having two electrodes and through which swimming pool water flows giving rise to an electric potential between the two electrodes in proportion to the oxidation/reduction potential of the pool water; means for measuring the electric potential across the electrodes in a manner correlated with halogen concentration in the pool water; a first operational amplifier in electric connection with the first cell and arranged to respond to a pH outside a predetermined range and give a first signal; a first means responsive to the first signal to adjust alkali or acid content of the pool water to restore pH to within the predetermined range; a second operational amplifier in electric connection with the second cell and arranged to respond to a halogen concentration outside a predetermined range and give a second signal; second means responsive to the second signal to adjust halogen concentration in the pool water to restore halogen concentration to within the predetermined range; and means for circulating pool water to, through and from each electrochemical cell and to and from a swimming pool water supply.

2. A swimming pool system in accordance with claim 1 comprising a recording device in operational connection with at least one electrochemical flow cell, recording the potential developed in the cell as a graph against time, and providing a time record of the response of the cell to pool water.

3. A swimming pool system according to claim 2, in which a separate recording device is connected to each electrochemical flow cell.

4. A swimming pool system according to claim 1, in which the electrochemical flow cell responding to oxidation/reduction potential of the pool water comprises a sensing electrode, a reference electrode, and an external electrolyte comprising the pool water.

5. A swimming pool system according to claim 4, in which the reference electrode comprises an internal half-cell supported in a container of nonconductive material containing a salt solution, an internal electrolyte and a liquid junction structure of an ion-permeable material.

6. A swimming pool system according to claim 5, in which the salt solution in the internal half-cell comprises a surfactant modifying the contact angle between the solution and the liquid junction structure to less than about 90°, so that the liquid junction structure is more permeable to water.

7. A swimming pool system according to claim 4, in which the sensing electrode is a platinum electrode.

8. A swimming pool system according to claim 1, in which the electrochemical flow cell responding to hydrogen/hydroxyl ion concentration of the pool water comprises a sensing electrode, a reference electrode, and an external electrolyte comprising the pool water.

9. A swimming pool system according to claim 8, in which the reference electrode comprises an internal half-cell supported in a container of nonconductive material containing a salt solution, an internal electrolyte and a liquid junction structure of an ion-permeable material.

10. A swimming pool system according to claim 9, in which the salt solution in the internal half-cell comprises a surfactant modifying the contact angle between the solution and the liquid junction structure to less than about 90°, so that the liquid junction structure is more permeable to water.

11. A swimming pool system according to claim 8, in which the sensing electrode is a glass electrode.

12. A swimming pool system according to claim 1, comprising a third operational amplifier arranged to respond to a pH outside a predetermined range and giving an alarm signal, and a fourth operational amplifier arranged to respond to an oxidation/reduction potential outside a predetermined range, and give an alarm signal.

13. A swimming pool system according to claim 1, in which the first operational amplifier is arranged to actuate a solenoid valve controlling flow of one of acid or base to the pool water, to restore pH to within a predetermined range.

14. A swimming pool system according to claim 1, in which the second operational amplifier is arranged to actuate a solenoid valve controlling flow of a halogen-liberating substance to the pool water, to restore the oxidation/reduction potential to within a predetermined range.

15. A swimming pool system according to claim 1, comprising a third operational amplifier arranged to respond to a continued pH outside a predetermined range and actuate a solenoid valve cutting off flow of one of acid or base to the pool water.

16. A swimming pool system according to claim 1, comprising a third operational amplifier arranged to respond to a continued oxidation/reduction potential outside a predetermined range, and actuate a solenoid valve cutting off flow of halogen-liberating substance to the pool water.

17. A swimming pool system according to claim 1, in which the pH range to which the first operational amplifier responds is below about 7.4 and above about 9.

18. A swimming pool system according to claim 1, in which the pH range to which the first operational amplifier responds is below about 7.4 and above about 7.6.

19. A swimming pool system according to claim 1, in which the oxidation/reduction potential range to which the second operational amplifier corresponds to a halogen concentration below about 0.1 ppm and above about 10 ppm.

20. A swimming pool system according to claim 1, in which the oxidation/reduction potential range to which the second operation amplifier corresponds to a halogen concentration below about 0.1 ppm and above about 1 ppm.

* * * * *